US006860941B2

(12) United States Patent
Sohama et al.

(10) Patent No.: US 6,860,941 B2
(45) Date of Patent: Mar. 1, 2005

(54) METHOD FOR MANUFACTURING HIGH-PURITY POTASSIUM FLUORONIOBATE CRYSTAL, RECRYSTALLIZATION BATH USED IN MANUFACTURING METHOD THEREOF AND HIGH-PURITY POTASSIUM FLUOROTANTALATE CRYSTAL OR HIGH-PURITY POTASSIUM FLUORONIOBATE CRYSTAL OBTAINED BY MANUFACTURING METHOD THEREOF

(75) Inventors: Yoshio Sohama, Tokyo (JP); Hiromichi Isaka, Tokyo (JP); Kenji Higashi, Tokyo (JP); Masanori Kinoshita, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 91 days.

(21) Appl. No.: 10/276,295

(22) PCT Filed: Apr. 2, 2002

(86) PCT No.: PCT/JP02/03286

§ 371 (c)(1),
(2), (4) Date: Nov. 21, 2002

(87) PCT Pub. No.: WO02/083568

PCT Pub. Date: Oct. 24, 2002

(65) Prior Publication Data

US 2003/0136330 A1 Jul. 24, 2003

(30) Foreign Application Priority Data

Apr. 6, 2001 (JP) ........................................ 2001-108408

(51) Int. Cl.⁷ .............................................. C30B 21/02
(52) U.S. Cl. ........................................ 117/68; 423/464

(58) Field of Search ............................. 117/68; 423/464

(56) References Cited

U.S. PATENT DOCUMENTS 3,907,976 A    9/1975   Hogan et al.

FOREIGN PATENT DOCUMENTS

| JP | 49-032897 A | 3/1974 |
|----|-------------|--------|
| JP | 01-192728 A | 8/1989 |
| JP | 04-002618 A | 1/1992 |
| JP | 04-021524 A | 1/1992 |
| JP | 2001-180935 A | 7/2001 |
| JP | 2001-329321 A | 11/2001 |
| JP | 2002-080223 A | 3/2002 |
| WO | WO 02/44087 A1 | 6/2002 |

*Primary Examiner*—Felisa Hiteshew
(74) *Attorney, Agent, or Firm*—Rothwell, Figg, Ernst & Manbeck, P.C.

(57) ABSTRACT

It is an object to provide a product having a good crystal particle size distribution of a high-purity potassium fluorotantalate crystal or a high-purity potassium fluoroniobate crystal without using a physical method for particle classification. To that end, a method for manufacturing a high-purity potassium fluorotantalate crystal or a high-purity potassium fluoroniobate crystal is used, wherein the recrystallizing step comprising a first cooling process of cooling a saturated solution with a temperature of 60° C. to 90° C. obtained in the dissolving step at a cooling speed of T° C./hour until the solution temperature of the saturated solution becomes a temperature of the range of 35 to 50° C., and a second cooling process of cooling the solution at a cooling speed of [T−18]° C./hour to [T−1]° C./hour from the end of the first cooling process to the solution temperature becoming a temperature of 10 to 20° C.

17 Claims, 3 Drawing Sheets

METHOD FOR MANUFACTURING HIGH-PURITY POTASSIUM FLUORONIOBATE CRYSTAL, RECRYSTALLIZATION BATH USED IN MANUFACTURING METHOD THEREOF AND HIGH-PURITY POTASSIUM FLUOROTANTALATE CRYSTAL OR HIGH-PURITY POTASSIUM FLUORONIOBATE CRYSTAL OBTAINED BY MANUFACTURING METHOD THEREOF

TECHNICAL FIELD

The present invention relates to a method for manufacturing a high-purity potassium fluorotantalate crystal or a high-purity potassium fluoroniobate crystal, a recrystallization bath used in the manufacturing method thereof, and a high-purity potassium fluorotantalate crystal or a high-purity potassium fluoroniobate crystal obtained by the process thereof.

BACKGROUND ART

Recently, there has been a rapid growth in demand for a granular potassium fluorotantalate crystal and a high-purity potassium fluoroniobate crystal as materials for obtaining tantalum particles or niobium particles used for producing an anode of a condenser, a tantalum condenser or a niobium condenser. In this case, a high-purity potassium fluorotantalate crystal or a high-purity potassium fluoroniobate crystal is used as tantalum particles or niobium particles obtained by reduction of the crystal, for example, by contact-reacting it with fumes of metallic sodium.

Accordingly, the interface area of the contact reaction with metallic sodium fumes is a factor of determining the reduction rate when the crystal is reduced to tantalum particles or niobium particles. In general, a potassium fluorotantalate crystal or a potassium fluoroniobate crystal is granular. Thus, the finer the particles, the larger the interface area of the contact reaction is allowed to be. This seems to preferably increase the reduction rate as well. As a result, there has been required the particle size of a potassium fluorotantalate crystal being 4 mm or smaller in order to attain a reduction rate of a minimum requirement industrially needed.

On the other hand, contact with metallic sodium fumes is carried out at a high temperature, and therefore containing crystals with a particle size of 0.15 mm or less in quantity effects sintering of tantalum particles or niobium particles reduced during reduction treatment. In addition, tantalum particles or niobium particles used in production of a high capacity condenser need to be fine. However, when a high-purity potassium fluorotantalate crystal or a high-purity potassium fluoroniobate crystal, the raw material thereof, is too fine, it cannot be obtained as fine metallic particles due to the occurrence of sintering during the reduction to metallic tantalum or metallic niobium. Further, although the same can be said of general metallic particulates, fine metallic particles are highly flammable and thus an easily scattering level of fine particles is not preferable from the viewpoint of operational safety as well.

Thus, sintering of tantalum particles or niobium particles makes it impossible to ensure uniform dispersibility when they are used for condensers, failing in acquisition of good condenser performance. Accordingly, the industry has requested that a potassium fluorotantalate crystal or a potassium fluoroniobate crystal has a particle size of 4 mm or less and the number of particles with a particle size of 0.15 mm or less is to be decreased as much as possible. On the contrary, when a high-purity potassium fluorotantalate crystal is manufactured by a present method, a potassium fluorotantalate crystal with a particle size of 0.15 mm or less accounts on average for 42% or more of the total weight.

In such a case, generally when the particle sizes of powders are tried to be simply divided, physical methods for particle classification such as air classification and sieve classification by repetition can easily attain a target range of particle sizes.

However, general physical methods for particle classification can hardly be applied repeatedly to a potassium fluorotantalate crystal or a potassium fluoroniobate crystal. In other words, these crystal particles are brittle, and thus a plurality of applications of a physical method for particle classification creates a factor of significantly decreasing the yield of a product with a target crystal particle size inasmuch as crystal particles collide to each other in a particle classification step and are likely to be crushed into fine particles. In addition, application of a physical method for particle classification mixes a variety of impurities as contamination in a particle classification step, which effects a factor of lowering purity. This factor is avoided not only in a condenser application, but in any applications.

Hence, there has been required a manufacturing method that can produce a high-purity potassium fluorotantalate crystal or a high-purity potassium fluoroniobate crystal of a crystal particle size distribution matched with a level demanded by the market in steps of manufacturing a potassium fluorotantalate crystal or a potassium fluoroniobate crystal without utilizing a physical method for particle classification.

DISCLOSURE OF THE INVENTION

Figure 1:
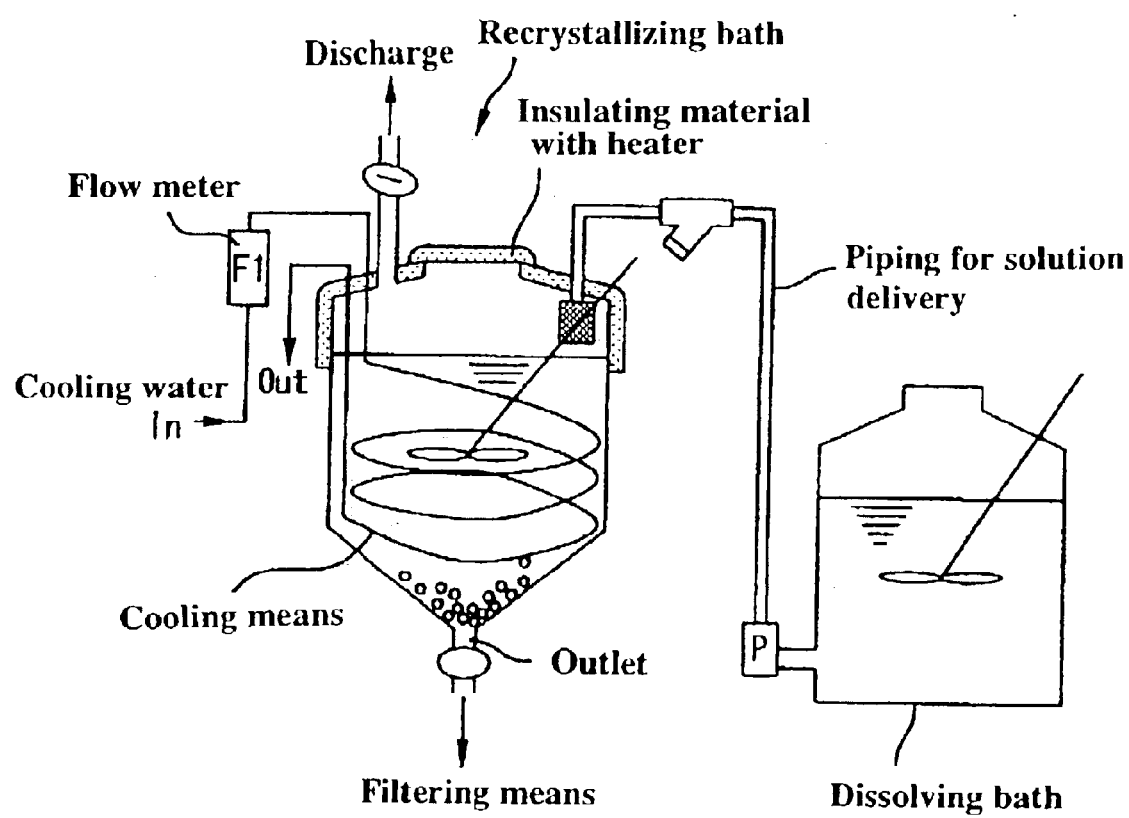
FIGS. 1 and 2 are schematic sectional views of a recrystallization bath used in the present invention.

Under such circumstances, the present inventors have invented a process, etc., as will be described below, for producing a high-purity potassium fluorotantalate crystal or a high-purity potassium fluoroniobate crystal, which feature recrystallizing steps thereof. Here, in order to facilitate the understanding of the present invention, the authors will, first, discuss general processes of manufacturing a high-purity potassium fluorotantalate crystal or a high-purity potassium fluoroniobate crystal, relating to the present invention.

Common high-purity potassium fluorotantalate crystals or high-purity potassium fluoroniobate crystals are shipped as packaged products subsequent to manufacturing steps that include <1> a dissolving step of dissolving into hydrofluoric acid solution a saturated solution any one of raw potassium fluorotantalate, raw potassium fluoroniobate and raw potassium oxyfluoroniobate obtained by synthesis, <2> a recrystallizing step of obtaining granular recrystallized potassium fluorotantalate or recrystallized potassium fluoroniobate by cooling the saturated solution in a recrystallization bath, <3> a filtering step of filtering granular recrystallized potassium fluorotantalate or recrystallized potassium fluoroniobate from a solution subsequent to the recrystallizing step, <4> a drying step of drying filtered granular recrystallized potassium fluorotantalate or recrystallized potassium fluoroniobate, and <5> a sieving step of particle-classifying granular recrystallized potassium fluorotantalate or recrystallized potassium fluoroniobate after drying. Accordingly, a manufacturing method relating to the present invention basically adopts a similar flow as well.

The claims include a process of manufacturing a high-purity potassium fluorotantalate crystal or a high-purity potassium fluoroniobate crystal comprising a dissolving step of producing a saturated solution using a hydrofluoric acid solution and any one of raw potassium fluorotantalate, raw potassium fluoroniobate and raw potassium oxyfluoroniobate, a recrystallizing step of obtaining granular recrystallized potassium fluorotantalate or recrystallized potassium fluoroniobate by cooling the saturated solution in a recrystallization bath, a filtering step of filtering granular recrystallized potassium fluorotantalate or recrystallized potassium fluoroniobate from a solution subsequent to the recrystallizing step, and a drying step of drying filtered granular recrystallized potassium fluorotantalate or recrystallized potassium fluoroniobate; in which the recrystallizing steps comprises a first cooling process of cooling the saturated solution with a temperature of 60° C. to 90° C. obtained in the dissolving step at a cooling speed of T° C./hour until the solution temperature of the saturated solution becomes a temperature of the range of 35 to 50° C. and a second cooling process of cooling the solution at a cooling speed of [T−18]° C./hour to [T−1]° C./hour from the end of the first cooling process to the solution temperature becoming a temperature of 10 to 20° C., in the recrystallizing step.

This manufacturing method has two characteristics: <1> the solution temperature of a saturated solution in the dissolving step being from 60 C to 90° C. and <2> the cooling speed in the recrystallizing step being controlled in a given condition. Namely, the solution is cooled at T° C./hour from a solution temperature of 60° C. to 90° C. of the saturated solution to 35 to 50° C., and after the temperature reaches the range of the target solution temperature, the solution is cooled at a speed of [T−18]° C./hour to [T−1]° C./hour to a temperature of 10° C. to 20° C.

The aforementioned characteristic <1>, the solution temperature starting recrystallization being controlled in a given range, means the following. Any one of raw potassium fluorotantalate, raw potassium fluoroniobate and raw potassium oxyfluoroniobate is used as a starting material. Raw potassium fluorotantalate as a starting material is dissolved with stirring in a hydrofluoric acid solution to give a saturated potassium fluorotantalate solution; raw potassium fluoroniobate or raw potassium oxyfluoroniobate as a starting material is dissolved in a hydrofluoric acid solution to give a saturated potassium fluoroniobate solution. Therefore, in above and below, a "saturated solution" refers to at least one of a saturated potassium fluorotantalate solution and a saturated potassium fluoroniobate solution.

A saturated solution means that the content of potassium fluorotantalate or potassium fluoroniobate in a saturated solution is controlled in a given level because the amount of potassium fluorotantalate or potassium fluoroniobate dissolved in a saturated solution differs dependent on the temperature of each solution. The higher the content of potassium fluorotantalate or potassium fluoroniobate in a saturated solution, the higher the speed of formation of the seed crystal in the early stage of recrystallization. As the composition of a saturated solution of potassium fluorotantalate determined by taking into account the object of the present invention, preferably used are the solution compositions of 20 g/L to 30 g/L for the tantalum concentration, 5 g/L to 20 g/L for the potassium concentration and 50 to 80 g/L for the hydrofluoric acid (the total hydrofluoric acid concentration calculated from the fluorine concentration). In addition, as the composition of a saturated solution of potassium fluoroniobate, preferably used are the solution compositions of 30 g/L to 50 g/L for the niobium concentration, 30 g/L to 70 g/L for the potassium concentration and 250 to 350 g/L for the hydrofluoric acid (the total hydrofluoric acid concentration calculated from the fluorine concentration). Also, a saturated solution obtained in the solution temperature range of 60° C. to 90° C. is used as a starting solution for recrystallization.

Furthermore, the aforementioned condition <2> means that the formation range of a seed crystal, a process of recrystallization, is separated from the growth range of the formed seed crystal to obtain a variety of recrystallized particles of a targeted particle size distribution. In other words, strictly considering the recrystallization process in a recrystallizing step, when a saturated solution is in a super-saturated concentration relative to the solution temperature, crystallization of a seed crystal continuously occurs to the temperature range of a low temperature solution even if the solution temperature is lowered. Thus, a seed crystal crystallized immediately after the start of cooling of the saturated solution continues to grow to the end of cooling to allow its particle size to increase, while a seed crystal crystallized just prior to the end of cooling does not sufficiently grow and keeps its fine particle size. In this manner, there seems to be obtained recrystallized particles with a specific particle size distribution. Therefore, the present invention includes the first cooling process for obtaining a necessary amount of seed crystal to primarily crystallize the seed crystal and the second cooling process for restraining the crystallization of the seed crystal, set as a step of more mildly cooling the crystal than the first cooling process, in such a way that the growth of the seed crystal crystallized in the first cooling process is superior to that in the second cooling process. The present invention can attain its object only when the aforementioned characteristic <2> is combined with the aforementioned characteristic <1>.

The steps will be described step by step hereinafter. First, "the dissolving step of producing a saturated solution using a hydrofluoric acid solution and any one of raw potassium fluorotantalate, raw potassium fluoroniobate and raw potassium oxyfluoroniobate" will be discussed. Here, "raw potassium fluorotantalate" generally refers to material obtained by precipitating and filtering raw potassium fluorotantalate after a tantalum solution is mixed with a hydrofluoric acid solution and to this mixture is added potassium chloride and then is allowed to react with stirring at a specific solution temperature. Also, "raw potassium fluoroniobate or raw potassium oxyfluoroniobate" generally refers to material obtained by precipitating and filtering raw potassium fluoroniobate or raw potassium oxyfluoroniobate after a niobium solution is admixed with a hydrofluoric acid solution and to this mixture is added potassium chloride and then is allowed to react with stirring at a specific solution temperature.

Next, re-dissolving any one of raw potassium fluorotantalate, raw potassium fluoroniobate and raw potassium oxyfluoroniobate in a hydrofluoric acid solution is the dissolving step of the present invention. In general, this dissolving step obtains a saturated solution by re-dissolving with agitation raw potassium fluorotantalate, raw potassium fluoroniobate or raw potassium oxyfluoroniobate through the use of a 55 wt % hydrofluoric acid solution. Dissolution of raw potassium oxyfluoroniobate by the addition of a hydrofluoric acid solution eliminates its oxygen, causing the saturated solution itself to become a saturated potassium fluoroniobate solution. In the present invention, the solution temperature at this time is made to be 60° C. to 90° C. A primary purpose of setting the temperature in this range is to adjust the content of raw potassium fluorotantalate or raw potassium fluoroniobate in a saturated solution prior to recrystallization. Normally, as the content of raw potassium fluorotantalate or raw potassium fluoroniobate in a saturated solution is increased, the amount of crystal precipitated by recrystallization increases as a matter of course. Therefore, when higher productivity is to be obtained, the dissolving temperature must be raised and the contents of potassium fluorotantalate or potassium fluoroniobate must be increased. However, as the solution temperature becomes 90° C. or higher, the evaporation of water is speeded up to cause concentration of potassium fluorotantalate or potassium fluoroniobate, which in turn starts unintentional recrystallization, thereby making it difficult to control the distribution of recrystallized particles.

On the other hand, the lower limit temperature of 60° C. ensures efficient productivity of potassium fluorotantalate or potassium fluoroniobate and is determined in terms of obtaining a saturated solution of a minimally needed concentration in order to gain a recrystallized particle distribution of industrially required high-purity potassium fluorotantalate or high-purity potassium fluoroniobate.

A saturated solution obtained as discussed above is introduced into a recrystallizing bath in the recrystallizing step and granular recrystallized potassium fluorotantalate or recrystallized potassium fluoroniobate is obtained by utilizing the saturated solution as a mother liquor and cooling it. The present invention separates this cooling step into two stage areas as discussed below and controls them. Hence, a step of cooling a saturated solution with a temperature of 60° C. to 90° C. obtained in the dissolving step to a temperature of 35 to 50° C. of the solution is referred to as the first cooling process. Additionally, a step of cooling the solution from the end point of the first cooling process to a temperature of 10 to 20° C. is designated as the second cooling process.

At this time, in the present invention, when the first cooling process performs cooling at a cooling speed of T° C./hour, the second cooling process is controlled at a cooling speed of [T−18]° C./hour to [T−1]° C./hour. It is to be noted that the value of [T−18] to [T−1] is not negative or 0, but is larger than 0 and positive; however, it is not necessarily positive in all the area of this range. Namely, for example, when T=5° C./hour is adopted as a condition, a cooling temperature of 1 to 4° C./hour may be selected in the second cooling process. Therefore, considered in this manner, when the temperature of the first cooling process is set to be a certain temperature, a temperature range to be adopted in the second cooling process is automatically determined. Control of the cooling speed is not limited to the two-stage step as described above and the control of the cooling speed by a multi-stage step is possible. However, the latter case increases the cost required for the control system of the cooling speed, which in turn increases the production cost, making it impossible to industrially realize.

The present inventors understand that this first cooling process includes the area wherein a seed crystal of potassium fluorotantalate to be recrystallized is crystallized from a saturated potassium fluorotantalate solution. In other words, the first cooling process includes the area of being able to control the number and properties of seed crystals to be crystallized. For example, the number of seed crystals to be crystallized is increased when the cooling speed is increased, while the particle size distribution of recrystallization particles tends to readily vary. On the other hand, the number of seed crystals to be crystallized is decreased when the cooling speed is made slow, while the particle size distribution of recrystallization particles tends to hardly vary. Considering these points, setting of the value of the cooling speed itself for recrystallization is to be determined taking into account the final applications and productivity inasmuch as products of high-purity potassium fluorotantalate crystals or high-purity potassium fluoroniobate crystals have a wide variety of applications. In the present case, arbitrary temperature setting is regarded to be possible. Also, the crystal particle size distribution of a product of a high-purity potassium fluorotantalate crystal or a high-purity potassium fluoroniobate crystal varies dependent on the way to control the temperature of the subsequent second cooling process as well.

The cooling speed of the second cooling process, when taking the cooling speed of the first cooling process as T° C./hour, is controlled between [T−18]° C./hour to [T−1]° C./hour. For example, if T=20, then the cooling speed of the first cooling process is 20° C./hour, and thus the cooling speed of the second cooling process is controlled in the range of 2° C./hour to 19° C./hour. This second cooling process appears to be a step of growing the seed crystal crystallized in the first cooling process. Therefore, the reason why the second cooling speed has a specific range is that the speed is to be set depending on the level of the particle size distribution of a recrystallization particle to be obtained.

However, in terms of the relationship with the cooling speed T° C./hour of the first cooling process, setting of the cooling speed of the second cooling process to be within the range of [T−18]° C./hour to [T−1]° C./hour has been shown to give a particle size distribution with less variation of a recrystallization particle of a recrystallized potassium fluorotantalate crystal or a recrystallized potassium fluoroniobate crystal to be obtained, as compared with the case of cooling with a non-changing cooling speed. The lower limit of the cooling speed of the [T−18]° C./hour refers to the slowest cooling speed. The slower the cooling speed, the slower and larger the growth of a recrystallization particle. A speed lower than the limit speed cannot satisfy the productivity industrially required. This results in generation of variations insignificant with the case of adopting a uniform cooling speed without setting a temperature difference. The upper limit of the cooling speed of the [T−1]° C./hour was studied based on the idea of facilitating the growth of a recrystallization particle by rendering slower the cooling speed of the second cooling process than that of the first cooling process. As a result, making the cooling speed of the second cooling process only by 1° C./hour slower than the cooling speed of the first cooling process dramatically decrease the variations of a particle size distribution of a growing recrystalization particle. This will be discussed in reference with Table 1.

Table 1 shows a particle size distribution of a high-purity potassium fluorotantalate crystal that is obtained by recrystallization using as a mother liquor a saturated potassium fluorotantalate solution with a solution temperature of 65° C. and collection by filtration of the resultant granular recrystallized potassium fluorotantalate and drying. A targeted particle size distribution to be formed was set from 0.15 mm to 4.0 mm. Accordingly, particle sizes are classified into a recrystallized particle with a particle diameter over 4.0 mm, a recrystallized particle with a particle diameter of 0.15 mm to 4.0 mm, and a recrystallized particle with a particle diameter under 0.15 mm, the ratios by weight of which will be indicated. A particle size distribution of Sample (a) is shown in Table 1 that is a high-purity potassium fluorotantalate crystal produced by recrystallization in the manufacturing method of the present invention at a cooling speed of 10° C./hour (T=10) in the first cooling process and at a cooling speed of 7° C./hour (T–3) in the second cooling process. A particle size distribution of Sample (b) is shown that is a high-purity potassium fluorotantalate crystal produced by recrystallization in the manufacturing method of the present invention at a cooling speed of 10° C./hour (T=10) in the first cooling process and at a cooling speed of 9° C./hour (T–1) in the second cooling process. Further, a particle size distribution of Sample (c) is shown that is a high-purity potassium fluorotantalate crystal produced by recrystallization using a constant cooling speed of 10° C./hour. Furthermore, a particle size distribution of Sample (d) is shown in Table 1 that is a high-purity potassium fluorotantalate crystal produced by recrystallization using a constant cooling speed of 7° C./hour.

TABLE 1

Manufacturing test for high-purity potassium fluorotantalate

| Range of particle size distribution | Formation ratio by weight (wt %) | | | |
|---|---|---|---|---|
| (mm) | Sample (a) | Sample (b) | Sample (c) | Sample (d) |
| Under 0.15 | 30 | 45 | 60 | 20 |
| 0.15 to 4.00 | 70 | 55 | 40 | 45 |
| Over 4.00 | 0 | 0 | 0 | 35 |

Table 1 clearly shows that Samples (a) and (b) have a higher yield of a crystal particle with a particle size distribution of 0.15 mm to 4.0 mm as compared with Samples (c) and (d). Also, comparison of the results of Sample (b) with those of Sample (c) reveals that making the cooling speed of the second cooling process slower only by 1° C./hour than that of the first cooling speed renders higher the yield of the crystal particle of 0.15 mm to 4.0 mm in the particle size distribution. Table 2 shows a similar verification test on high-purity potassium fluoroniobate, indicating that the results are almost identical to those of potassium fluorotantalate in Table 1.

TABLE 2

Manufacturing test for high-purity potassium fluoroniobate

| Range of particle size distribution | Formation ratio by weight (wt %) | | | |
|---|---|---|---|---|
| (mm) | Sample (a) | Sample (b) | Sample (c) | Sample (d) |
| Under 0.15 | 15 | 40 | 55 | 10 |
| 0.15 to 4.00 | 85 | 60 | 45 | 45 |
| Over 4.00 | 0 | 0 | 0 | 45 |

As can be seem from the above, if the cooling speed conditions of the first cooling process and the second cooling process in the recrystallizing step described in claim 1 are satisfied and an optimal cooling speed is set for each product, there can be obtained a recrystallized particle of a potassium fluorotantalate crystal or a fluoroniobate potassium crystal having a particle size distribution of few variations.

The following claim is the method for manufacturing a high-purity potassium fluorotantalate crystal or a high-purity potassium fluoroniobate crystal described in claim 1 at a cooling speed of T° C./hour being from 5° C./hour to 10° C./hour. When the cooling temperature of the first cooling process is determined like this claim, the cooling temperature of the second cooling process is as follows. For example, for T=5, the cooling temperature of the second cooling process lies in the range of 1 to 4° C./hour; for T=10, the cooling temperature of the second cooling process is in the range of 1 to 9° C.

Thus, adopting these conditions allows the average particle diameter of a recrystallized potassium fluorotantalate or a recrystallized potassium fluoroniobate to be 4 mm or smaller and allows the particle with a diameter of 0.15 mm or smaller to be decreased more than conventionally. Also, the setting allows the high-purity recrystallized potassium fluorotantalate crystal or the high-purity recrystallized potassium fluoroniobate crystal with a particle diameter of 0.15 to 4.0 mm, thus obtained, to make up 50 wt % or more. A high-purity potassium fluorotantalate crystal of this particle size distribution is particularly suitable for applications in tantalum condensers. In addition, a high-purity potassium fluoroniobate crystal of a similar particle size distribution is particularly suitable for applications in niobium condensers.

Further, a claim is a method for manufacturing a high-purity potassium fluorotantalate crystal or a high-purity potassium fluoroniobate crystal according to claim 1 or 2, wherein, with a recrystallizing bath where a poured saturated solution does not fill the entire space within the recrystallizing bath and the upper portion of the inside space has some unfilled part when the pouring of the solution has been completed, the recrystallizing step controls the space temperature of the unfilled part to be higher than the temperature of the aforementioned saturated solution in the recrystallizing bath by –5° C. to 20° C.

The recrystallizing step must not cause unintentional recrystalliztion so as not to vary the particle size distribution of recrystallized potassium fluorotantalate or recrystallized potassium fluoroniobate. The claims discussed above and the claims to be described below show inventions for solving the problems in the recrystallizing step from such a viewpoint. In other words, in the recrystallizing step, a saturated solution is placed in the recrystallizing bath and a recrystallized crystal of potassium fluorotantalate is formed by cooling therein. At this time, depending on the structure of recrystallizing bathes, some are used with the upper portion of the recrystallizing bath having a constant space (unfilled portion) as illustrated in FIG. 1, without filling a saturated solution until the inside space of the recrystallizing bath is completely filled. In this case, the presence of air in the unfilled portion of the recrystallizing bath is likely to effect recrystalliztion at the interface between the gas and liquid phases when the space temperature of this unfilled portion greatly differs from the temperature of the saturated solution, thus allowing unintentional recrystallization to proceed. As a result, this causes the broadening of the particle size distribution of the recrystallized crystal of potassium fluorotantalate or potassium fluoroniobate to be formed.

This is described using data in the following. The initial temperature of a saturated potassium fluorotantalate solution placed in a recrystallizing bath was set to be 65° C., the cooling temperature of the first cooling process in recrystallization 10° C./hour, and the cooling temperature of the second cooling process 5° C./hour to obtain recrystallized potassium fluorotantalate. After a filtering step and a drying step, granular recrystallized potassium fluorotantalate was subjected to particle classification by way of a sieving step to try to obtain a high-purity potassium fluorotantalate crystal with a particle diameter of 0.15 to 4.0 mm. Table 3 shows the relationship between the aforementioned space temperature and the proportion of the presence of the recrystallized crystal with particle diameters of 0.15 to 4.0 mm in the obtained high-purity potassium fluorotantalate crystal.

Table 4 shows the results of verification testing using a saturated potassium fluoroniobate solution, similar to and under conditions similar to the case of the saturated potassium fluorotantalate solution shown in Table 3. In this case as well, the results are similar.

TABLE 3

| Initial solution temperature (° C.) | Cooling speed (° C./hour) | | Difference between solution and space air temperature (° C.) | Proportion of presence of recrystallized particles with particle diameters of 0.15 to 4.0 mm in product (%) |
|---|---|---|---|---|
| | First cooling process | Second cooling process | | |
| 65 | 10 | 5 | +25 | 61 |
| | | | +20 | 77 |
| | | | +15 | 81 |
| | | | +10 | 90 |
| | | | +5 | 95 |
| | | | 0 | 87 |
| | | | −5 | 65 |
| | | | −10 | 48 |
| | | | −15 | 48 |
| | | | −20 | 44 |

• The initial solution temperature refers to a temperature when a saturated potassium fluorotantalate solution is placed in the recrystallizing bath.
• The cooling speed means a cooling speed in the recrystallizing step.
• The difference between the solution temperature and the space air temperature refers to a temperature difference relative to the solution temperature when the air temperature of the space created in the upper portion of the inside space of the recrystallizing bath is controlled. Therefore, when the solution temperature is decreased in the recrystallizing step, the space air temperature is also lowered to maintain the temperature difference.
• The product refers to a high-purity potassium fluorotantalate crystal obtained passing through the sieve-classifying step subsequent to the recrystallizing step.

The results of Table 3 show that the initial space air temperature needs to be within the range of 60° C. to 85° C. when the initial solution temperature is set at 65° C. in order for the proportion of presence of the recrystallized crystal with a particle diameter of 0.15 to 4.0 mm in the aforementioned high-purity potassium fluorotantalate crystal making up 50% or more. Namely, the space air temperature needs to lie in the range of (solution temperature −5° C.) to (solution temperature +20° C.). When the space air temperature is set in the range of (solution temperature +20° C.) or higher, the saturated potassium fluorotantalate solution is caused to condense at the gas liquid interface in the recrystallizing bath to thereby effect unintentional recrystallization, when considering the relationship between the evaporation of water and the recrystallizing speed. As a result, the recrystallizing step appears to be difficult to control, which may lower the yield of a product having a target range of particle diameter. On the other hand, when the space air temperature becomes a temperature less than the solution temperature, unintentional recrystallization results inasmuch as the solution temperature of the saturated potassium fluorotantalate solution lowers earlier at the gas liquid interface in the recrystallizing bath. Therefore, even if the temperature of the subsequent recrystallizing step is controlled, the yield of a product having a target range of particle diameter seems to be lowered. However, unexpected recrystallization at the gas liquid interface can be controlled even in the range of (solution temperature −5° C.) to the solution temperature if the solution is sufficiently agitated. When the temperature of the space air becomes lower than (solution temperature −5° C.), unexpected recrystallization is likely to occur because the cooling of the solution at the gas liquid interface occurs early even if the solution is stirred.

TABLE 4

| Initial solution temperature (° C.) | Cooling speed (° C./hour) | | Difference between solution temperature (° C.) | Proportion of presence of recrystallized particles with particle diameters of 0.15 to 4.0 mm in product (%) |
|---|---|---|---|---|
| | First cooling process | Second cooling process | and space air temperature (° C.) | |
| 65 | 10 | 5 | +25 | 61 |
| | | | +20 | 79 |
| | | | +15 | 80 |
| | | | +10 | 88 |
| | | | +5 | 92 |
| | | | 0 | 90 |
| | | | −5 | 51 |
| | | | −10 | 46 |
| | | | −15 | 45 |
| | | | −20 | 41 |

• The initial solution temperature refers to a temperature when a saturated potassium fluoroniobate solution is placed in the recrystallizing bath.
• The cooling speed means a cooling speed in the recrystallizing step.
• The difference between the solution temperature and the space air temperature refers to a temperature difference relative to the solution temperature when the air temperature of the space created in the upper portion of the inside space of the recrystallizing bath is controlled. Therefore, when the solution temperature is decreased in the recrystallizing step, the space air temperature is also lowered to maintain the temperature difference.
• The product refers to a high-purity potassium fluoroniobate crystal obtained passing through the sieve-classifying step subsequent to the recrystallizing step.

Taking into consideration the above, when a recrystallizing bath as shown in FIG. 1 is employed, the space temperature of the unfilled portion needs to be controlled to lie in the range of (solution temperature −5° C.) to (solution temperature +20° C.). Therefore, in the recrystallizing step, as the solution is cooled, the space air temperature as well as the initial space air temperature needs to be lowered.

Figure 2:
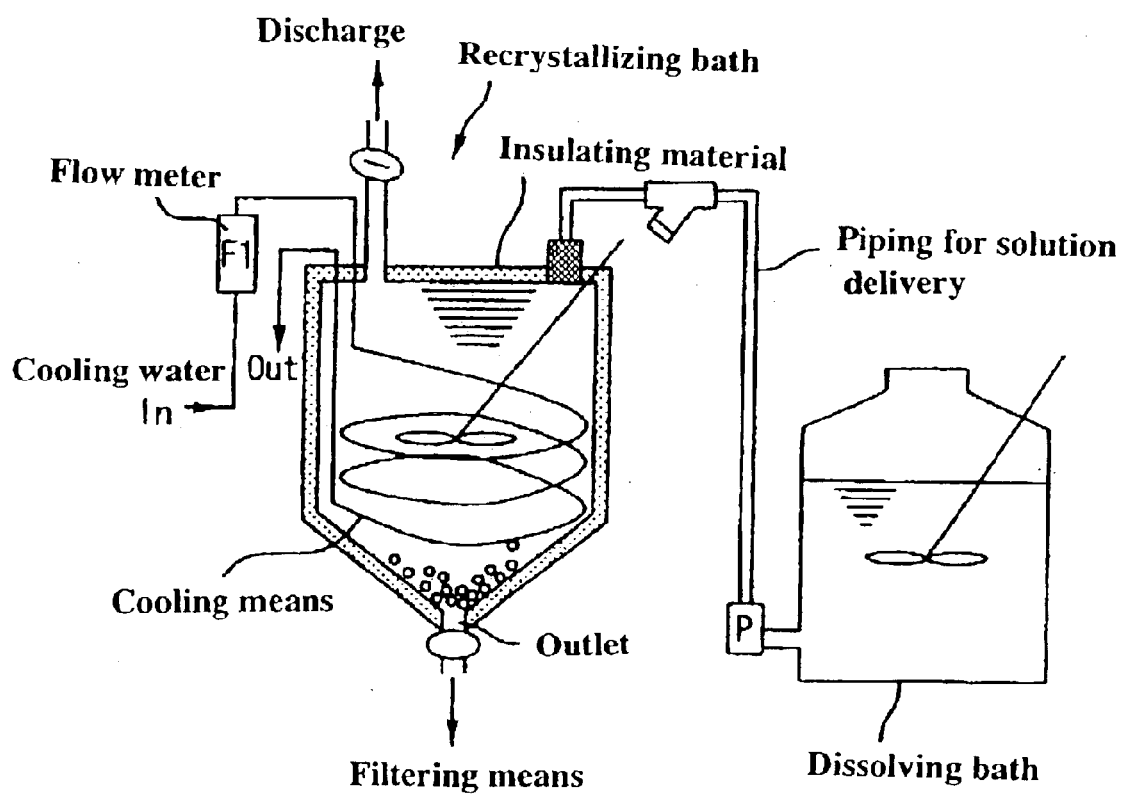

If the above idea is taken when the aforementioned recrystallizing bath is used, use of a recrystallizing bath that can load a saturated solution until it fill the inner space of a recrystallizing bath as shown in FIG. 2 can prevent the generation of unintentional recrystallization when only the solution temperature of the saturated solution can be maintained.

Hence, another claim is a method for manufacturing a high-purity potassium fluorotantalate crystal or a high-purity potassium fluoroniobate crystal according to claim 1 or 2, wherein the recrystallizing step uses a recrystallizing bath that can have a poured saturated solution filled in the entire space within the recrystallizing bath. In this case, it is desirable to ensure the thermal insulation of piping that delivers a saturated solution from the dissolving step to the recrystallizing bath and the function of temperature keeping of the recrystallizing bath from the viewpoint of production technology.

Moreover, in order to further decrease the variations of the particle size distribution of a recrystallized particle, as described in claim 5, agitation must prevent the precipitation and standstill of generated, recrystallized potassium fluorotantalate or recrystallized potassium fluoroniobate in a saturated solution within the recrystallizing bath. In other words, the agitation of a solution in a recrystallizing bath is generally carried out for the purpose of eliminating the ununiformity of the solution temperature and a concentration distribution of the solution. However, the agitation is of a level of simply leveling the temperature distribution and concentration distribution of a solution leading to a flow of the solution only.

On the other hand, according to the present invention, "agitation prevents the precipitation and standstill of generated, recrystallized potassium fluorotantalate or recrystallized potassium fluoroniobate". Namely, the purpose of the agitation is to prevent generated, recrystallized potassium fluorotantalate or recrystallized potassium fluoroniobate from precipitating in the bottom of a recrystallizing bath and coming to stand still. When the force of agitation is weak, the precipitation speed increases with growth of a crystal, and when the precipitation speed is larger than the flowing speed of the solution, the formed crystal precipitates. When the agitation of a solution is insufficient like this case, new crystal nuclei are more likely to grow than crystal particles grow when the recrystallization particle recrystallizes from a mother liquor of a supersaturated state as the solution temperature decreases, thus generating fine recrystallized crystals in quantity. Then, when the crystals precipitate in the bottom of a recrystallizing bath and stand still without movement, the growth of recrystallized particles is inhibited, which prevents the growth to a targeted range of particle distribution, resulting in large variations of the particle size.

Hence, in addition to the flow of the solution, the flow of generated, recrystallized potassium fluorotantalate or recrystallized potassium fluoroniobate is also required at the same time. This indicates that the superiority of the growth of formed crystal nuclei must be kept by maintaining the state of generated, recrystallized potassium fluorotantalate or recrystallized potassium fluoroniobate flowing in the solution during the cooling of causing recrystallization. Means for agitation at the time is not particularly limited and any means that can be used for agitation of a saturated solution used in the present invention can be utilized. For example, means equipped with a stirring blade for agitation in the bottom of a recrystallizing bath is common. For example, when a recrystallized particle with a particle diameter of about 1 to 2 mm is tried to obtain in quantity, the flow speed of the solution must be set at 10 cm/second or more because the precipitation speed of this recrystallized particle is about 10 cm/second.

As described above, the agitation conditions of preventing the precipitation and standstill of generated, recrystallized potassium fluorotantalate or recrystallized potassium fluoroniobate do not simply depend on only the speed of stirring the solution, but on other factors such as particularly the shape of the blade, and vary with the design of equipment to be adopted, and thus cannot strictly limit the flow speed of the solution. However, according to a study by means of an existent apparatus by the present inventors, when the precipitation speed of a recrystallized particle to be generated is taken as 1, the flow speed of the solution has been shown to be set to be 3 to 30. In other words, for a recrystallized particle having a particle diameter of about 1 to 2 mm as discussed above, the flow speed of the solution is set in the range of 30 cm/second to 300 cm/second. Concerning the flow speed of the lower limit, a flow speed less than this does not allow the growth of a seed crystal to exceed the crystallization of a seed crystal. With the flow speed of the upper limit, agitation of the solution at a flow speed exceeding the speed causes generated recrystallized particles to collide to each other or collide with the stirring blade, resulting in crushing of the particles.

Thus, a claim is a recrystallizing bath used in a method for manufacturing a high-purity potassium fluorotantalate crystal or a high-purity potassium fluoroniobate crystal relating to the present invention, the recrystallizing bath comprising means for pouring a saturated solution obtained in the dissolving step into the bath, cooling means for lowering the solution temperature in the bath, and an outlet for taking out granular recrystallized potassium fluorotantalate or recrystallized potassium fluoroniobate obtained, as well as means for controlling the temperature of the space created in the upper portion of the bath after the saturated solution has been poured into the recrystallizing bath.

In other words, a recrystallizing bath used in the aforementioned manufacturing method must comprise at least <1> a piping pathway as means for pouring a saturated solution obtained in the dissolving step into the bath, <2> cooling means for lowering the solution temperature in order to control the cooling temperature of the recrystallizing step, <3> an outlet for taking obtained, granular recrystallized potassium fluorotantalate or recrystallized potassium fluoroniobate out of the bath, and <4> means for controlling the temperature of the space created in the upper portion of the bath.

FIG. 1 schematically shows such a recrystallizing bath. In particular, a recrystallizing bath relating to the present invention features the addition of the element described in <4> above. As long as this means is provided, the invention does not particularly limit the shape of the whole of the recrystallizing bath, the method used in each procedure, and the kind of disposition of each means in the recrystallizing bath. Means for controlling the aforementioned space temperature can utilize methods that include keeping the temperature by enclosing the upper portion of the recrystallizing bath using an insulating material and heating the upper portion of the recrystallizing bath via a heater. The present inventors have adopted a structure of embedding a heater in an insulating material. As a result, the manufacturing conditions indicated in the claim become possible to attain.

Another claim is a high-purity potassium fluorotantalate crystal obtained from a method for manufacturing a high-purity potassium fluorotantalate crystal or a high-purity potassium fluoroniobate crystal mentioned in the present invention, wherein the recrystallized particle with a particle diameter in the range of 0.15 mm to 4.0 mm makes up 50 wt % or more of the total recrystallized particle weight. Still another claim is a high-purity potassium fluoroniobate crystal obtained from a method for manufacturing a high-purity potassium fluorotantalate crystal or a high-purity potassium fluoroniobate crystal mentioned in the present invention, wherein the recrystallized particle with a particle diameter in the range of 0.15 mm to 4.0 mm makes up 50 wt % or more of the total recrystallized particle weight.

This, as discussed above, has an extremely excellent property as a high-purity potassium fluorotantalate crystal or a high-purity potassium fluoroniobate crystal used in the production of condensers. These, having few too fine particles, have no risk of causing an explosive accident and little blowing off by a slight wind. In addition, the reduction treatment of a high-purity potassium fluorotantalate crystal or a high-purity potassium fluoroniobate crystal, which is performed by making contact with fumes of metallic sodium under a high temperature atmosphere, can almost completely extinguish the phenomenon of tantalum particles or niobium particles sintering during reduction treatment because a proper particle size is acquired. Embodiments relating to the present invention will be discussed hereinafter.

BEST MODE FOR CARRYING OUT THE INVENTION

First Example

Figure 3:
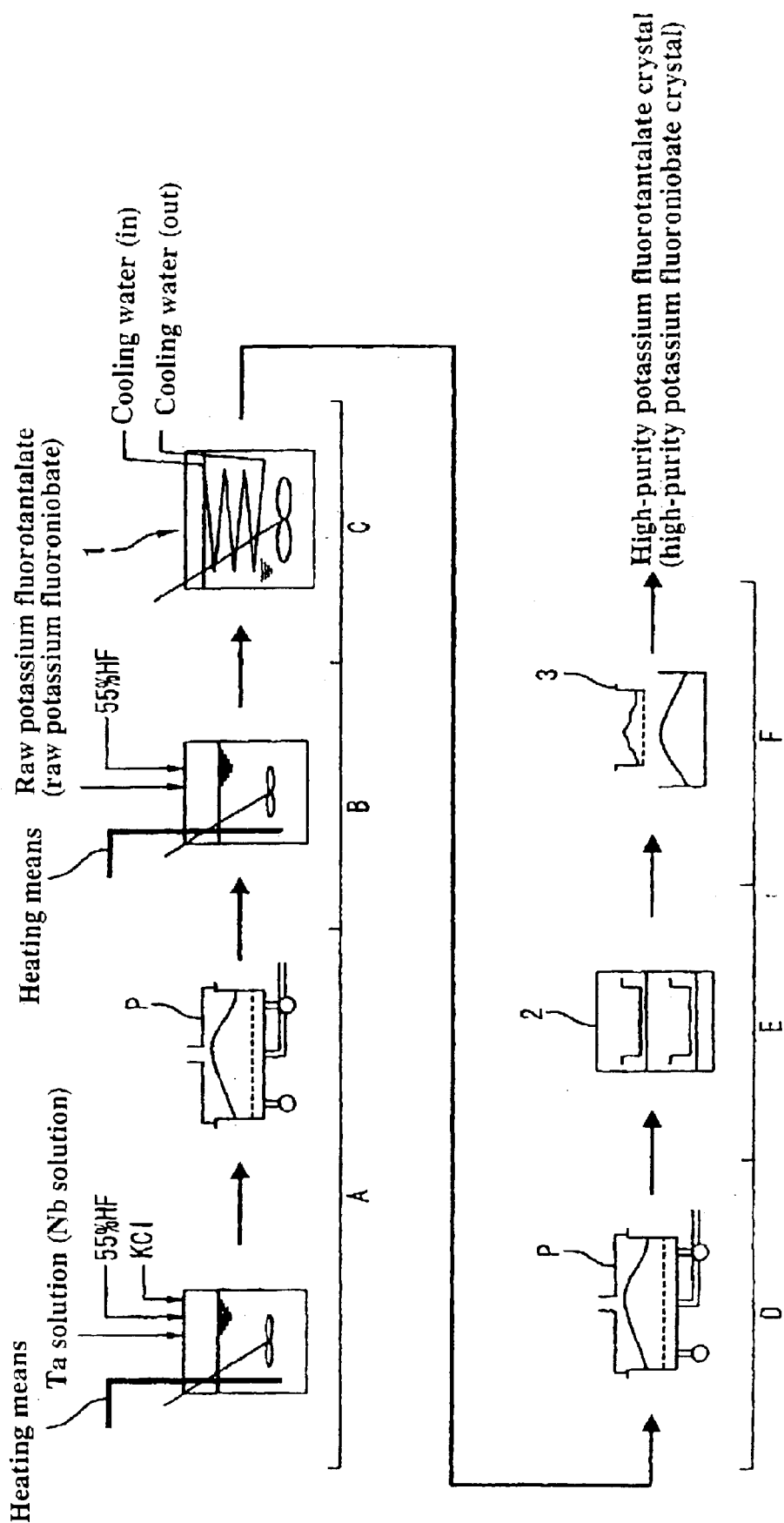
FIG. 3 is a schematic diagram illustrating a step of manufacturing a high-purity potassium fluorotantalate crystal or a high-purity potassium fluoroniobate crystal.

The present example will be described with reference to FIGS. 1 and 3. First, the production of raw potassium fluorotantalate will be discussed. Raw potassium fluorotantalate, as shown in a synthesizing step A in FIG. 3, was obtained by adding 360 g of a potassium chloride crystal to 3.6 liters of a high-purity tantalum solution (tantalum: 80 g/L, content of hydrogen fluoride: 30 g/L), dissolving the crystal with agitation at a solution temperature of 80° C., cooling the resulting solution to room temperature, and subsequently filtering using a filter press P.

The raw potassium fluorotantalate thus obtained, as shown in a dissolving step B, was re-dissolved in a hydrofluoric acid solution, or a recrystallizing solvent, to produce a saturated potassium fluorotantalate solution, at a solution temperature of 60° C., with a tantalum concentration of 25 g/L, a potassium concentration of 10 g/L and a hydrofluoric acid concentration of 60 g/L calculated from the fluorine concentration. Then, this saturated potassium fluorotantalate solution was delivered to a recrystallizing bath 1 of the following recrystallizing step C. The piping was covered with an insulating material during the delivery to prevent a decrease in the solution temperature of the saturated potassium fluorotantalate solution during the transport.

As the recrystallizing bath 1 used in this recrystallizing step C was used a recrystallizing bath 1 with a structure as illustrated in FIG. 1, wherein a saturated potassium fluorotantalate solution poured and filled in the recrystallizing bath 1 did not fill the entire inside space of the bath and kept an unfilled portion in the upper part. Therefore, a portion indicated in FIG. 1 as a "space temperature controlling means" was covered with an insulating material, and a decrease in the space temperature of the unfilled portion was prevented by inserting a heater into the inside of the insulating material to thereby enable the control of the space temperature. Here, the initial space temperature was controlled to become 70° C.

Then, the saturated potassium fluorotantalate solution was cooled with the cooling conditions of the recrystallizing step separated into those of the two stages of the first cooling process and the second cooling process. Recrystallized potassium fluorotantalate was obtained by adopting two kinds of conditions: conditions (i), in which the solution was cooled to 40° C. at a cooling speed of 10° C./hour in the first cooling process and then cooled to 10° C. at a cooling speed of 5° C./hour in the second cooling process, and conditions (ii), in which the solution was cooled to 40° C. at a cooling 5° C./hour in the first cooling process and then cooled to 10° C. at a cooling speed of 3° C./hour in the second cooling process was set.

From the solution subsequent to the completion of recrystallization as described above, formed, recrystallized potassium fluorotantalate was filtration collected by means of a filter press P in the filtering step D. Filtrated and collected, recrystallized potassium fluorotantalate was placed in a heat drying furnace 2 and dried at a temperature of 120° C. in the following drying step E.

Thereafter, in order to further ensure the product quality, the recrystallized potassium fluorotantalate after completion of drying operation was subjected to removal of a rough particle of 4.0 mm or larger using a 5 mesh sieve 3 in the sieving step F. The conduct of this sieving operation is not always needed, dependent on required quality of a product.

The steps are completed at this stage and the recrystallized potassium fluorotantalate after this sieving operation becomes a product as a high-purity potassium fluorotantalate crystal. The proportion was measured which the recrystallized particle with a particle diameter within the range of 0.15 mm to 4.0 mm contained in a high-purity potassium fluorotantalate crystal obtained from the manufacturing method relating to the present invention made up. In other words, the weight of the crystal remaining on a 5 mesh sieve was measured when a sieving operation was carried out using the sieve. Further, a sieving operation was conducted by means of a 100 mesh sieve and the weight of the crystal passed through the 100 mesh sieve was measured. These two crystal weights were subtracted from the crystal weight immediately after drying. This weight calculated was regarded as the weight that makes up the recrystallized particle with a particle diameter within the range of 0.15 mm to 4.0 mm and was taken as the proportion with respect to the crystal weight just subsequent to drying. The same thing was applied to the example below. As a consequence, the values were 89.7 wt % for the cooling step conditions (i) and 93.4 wt % for the cooling step conditions (ii), which are very good levels, not available in the current market.

Second Example

The present example will be described with reference to FIGS. 1 and 3. First, the production of raw potassium fluoroniobate will be discussed. Raw potassium fluoroniobate, as shown in a synthesizing step A in FIG. 4, was obtained by adding 360 g of a potassium chloride crystal to 3.6 liters of a high-purity niobium solution (niobium: 200 g/L, content of hydrogen fluoride: 250 g/L), dissolving the crystal with agitation at a solution temperature of 80° C., cooling the resulting solution to room temperature, and subsequently filtering using a filter press P.

The raw potassium fluoroniobate thus obtained, as shown in a dissolving step B, was re-dissolved in a hydrofluoric acid solution, or a recrystallizing solvent, to produce a saturated potassium fluoroniobate solution, at a solution temperature of 60° C., with a niobium concentration of 40 g/L, a potassium concentration of 50 g/L and a hydrofluoric acid concentration of 300 g/L calculated from the fluorine concentration. Then, this saturated potassium fluoroniobate solution was delivered to a recrystallizing bath 1 of the following recrystallizing step C. The piping was covered with an insulating material during the delivery to prevent a decrease in the solution temperature of the saturated potassium fluoroniobate solution during the transport.

As the recrystallizing bath 1 used in this recrystallizing step C was used a recrystallizing bath 1 with a structure as illustrated in FIG. 1, wherein a saturated potassium fluoroniobate solution poured and filled in the recrystallizing bath 1 did not fill the entire inside space of the bath and kept an unfilled portion in the upper part. Therefore, a portion indicated in FIG. 2 as a "space temperature controlling means" was covered with an insulating material, and a decrease in the space temperature of the unfilled portion was prevented by inserting a heater into the inside of the insulating material to thereby enable the control of the space temperature. Here, the initial space temperature was controlled to become 70° C.

Then, the saturated potassium fluoroniobate solution was cooled with the cooling conditions of the recrystallizing step separated into those of the two stages of the first cooling process and the second cooling process. Recrystallized potassium fluoroniobate was obtained by adopting two kinds of conditions: conditions (i), in which the solution was cooled to 40° C. at a cooling speed of 10° C./hour in the first cooling process and then cooled to 10° C. at a cooling speed of 5° C./hour in the second cooling process, and conditions (ii), in which the solution was cooled to 40° C. at a cooling 5° C./hour in the first cooling process and then cooled to 10° C. at a cooling speed of 3° C./hour in the second cooling process was set.

From the solution subsequent to the completion of recrystallization as described above, formed, recrystallized potassium fluoroniobate was filtration collected by means of a filter press P in the filtering step D. Filtrated and collected, recrystallized potassium fluoroniobate was placed in a heat drying furnace 2 and dried at a temperature of 120° C. in the following drying step E.

Thereafter, in order to further ensure the product quality, the recrystallized potassium fluoroniobate after completion of drying operation was subjected to removal of a rough particle of 4.0 mm or larger using a 5 mesh sieve in the sieving step F. The recrystallized potassium fluoroniobate after this sieving operation becomes a product as a high-purity potassium fluoroniobate crystal. The proportion was measured which the recrystallized particle with a particle diameter within the range of 0.15 mm to 4.0 mm contained in a high-purity potassium fluoroniobate crystal obtained from the manufacturing method relating to the present invention made up, as with the First Example. As a consequence, the values were 89.7 wt % for the cooling step conditions (i) and 93.4 wt % for the cooling step conditions (ii), which are very good levels, not available in the current market.

Industrial Applicability

According to the manufacturing method relating to the present invention, separating into two speeds the cooling speed in the recrystallizing step and controlling when obtaining a high-purity potassium fluorotantalate crystal or a high-purity potassium fluoroniobate crystal enables the great improvement of the yield of a recrystallized crystal with a targeted particle size distribution. This facilitates the handling in fields that industrially utilize a high-purity potassium fluorotantalate crystal or a high-purity potassium fluoroniobate crystal, particularly in the field of manufacturing condensers, and also enables dramatic improvement of the production yield of a product that utilizes as a raw material a high-purity potassium fluorotantalate crystal or a high-purity potassium fluoroniobate crystal.

What is claimed is:

1. A method for manufacturing a high-purity potassium fluorotantalate crystal or a high-purity potassium fluoroniobate crystal comprising the steps of
   dissolving for producing a saturated solution using a hydrofluoric acid solution and any one of raw potassium fluorotantalate, raw potassium fluoroniobate and raw potassium oxyfluoroniobate,
   recrystallizing for obtaining granular recrystallized potassium fluorotantalate or recrystallized potassium fluoroniobate by cooling said saturated solution with agitation in a recrystallization bath,
   filtering said granular recrystallized potassium fluorotantalate or recrystallized potassium fluoroniobate from a solution subsequent to the completion of the recrystallizing step, and
   drying said filtered granular recrystallized potassium fluorotantalate or recrystallized potassium fluoroniobate,
   wherein the recrystallizing step comprises a first cooling process of cooling the saturated solution with a temperature of 60° C. to 90° C. obtained in the dissolving step until the solution temperature of said saturated solution becomes a temperature of the range of 35 to 50° C., and
   a second cooling process of cooling the solution from the end of said first cooling process to said solution temperature becoming a temperature of 10 to 20° C., wherein a cooling speed in the first cooling process is higher than that of the second cooling process, and wherein a difference in the cooling speed between the first and second cooling processes is 1° C./hour or higher.

2. The method for manufacturing a high-purity potassium fluorotantalate crystal or a high-purity potassium fluoroniobate crystal according to claim 1, wherein the cooling speed of said first cooling process ranges from 5° C./hour to 20° C./hour and the cooling speed of said second cooling process ranges from 1° C./hour to 19° C./hour.

3. The method for manufacturing a high-purity potassium fluorotantalate crystal or a high-purity potassium fluoroniobate crystal according to claim 1, wherein the cooling speed of said first cooling process ranges from 5° C./hour to 10° C./hour and the cooling speed of said second cooling process ranges from 1° C./hour to 9° C./hour.

4. The method according to claim 1, wherein in the recrystallizing step, the saturated solution does not completely fill the recrystallizing bath, and a temperature of an unfilled portion of the recrystallizing bath is from 5° C. below to 20° C. above the temperature of the saturated solution.

5. The method according to claim 1, wherein in the recrystallizing step the saturated solution completely fills the recrystallizing bath.

6. The method according to claim 1, wherein in the recrystallizing step the saturated solution prevents the standstill of recrystallized potassium fluorotantalate or recrystallized potassium fluoroniobate.

7. High-purity potassium fluorotantalate crystals obtained according to the method of claim 1, the fluorotantalate crystals containing at least 50% by weight of particles with a particle diameter of from 0.15 to 4.0 mm.

8. High-purity potassium fluoroniobate crystals obtained according to the method of claim 1, the fluoroniobate crystals containing at least 50% by weight of particles with a particle diameter of from 0.15 to 4.0 mm.

9. The method according to claim 1, wherein the granular recrystallized potassium fluorotantalate or recrystallized potassium fluoroniobate crystals obtained after the drying step have a particle distribution of at least 50% by weight of particles with a particle diameter of from 0.15 to 4.0 mm.

10. The method according to claim 9, wherein the particle distribution is obtained without subjecting the particles to a particle classification step.

11. A method for producing high-purity potassium fluorotantalate or potassium fluoroniobate crystals comprising the steps of:
    producing a saturated solution by dissolving raw potassium fluorotantalate, raw potassium fluoroniobate or raw potassium oxyfluoroniobate in a hydrofluoric acid solution;
    recrystallizing granular recrystallized potassium fluorotantalate or recrystallized potassium fluoroniobate from the saturated solution by cooling and agitating the saturated solution;
    filtering the granular recrystallized potassium fluorotantalate or recrystallized potassium fluoroniobate from the saturated solution after completion of the recrystallizing step; and drying the filtered granular recrystallized potassium fluorotantalate or recrystallized potassium fluoroniobate, wherein the recrystallizing step comprises a first cooling step of cooling the saturated solution from a temperature of 60 to 90° C. obtained in the dissolving step to a temperature of 35 to 50° C., and a second cooling step of cooling the solution from the temperature reached at the end of the first cooling step to a temperature of 10 to 20° C., wherein a cooling rate in the first cooling step is at least 1° C. greater than a cooling rate in the second cooling step.

12. The method according to claim 11, wherein the cooling rate in the first cooling step is from 5 to 20° C./hour and the cooling rate in the second cooling step is from 1 to 19° C./hour.

13. The method according to claim 11, wherein the cooling rate in the first cooling step is from 5 to 10° C./hour and the cooling rate in the second cooling step is from 1 to 9° C./hour.

14. A system for use in the production of high-purity potassium fluorotantalate or potassium fluoroniobate crystals, comprising:

container means for containing a saturated solution comprising raw potassium fluorotantalate, raw potassium fluoroniobate or raw potassium oxyfluoroniobate and hydrofluoric acid;

cooling means for cooling the saturated solution in the container means in a first cooling step from an initial temperature of 60 to 90° C. to a temperature of 35 to 50 0C at a first cooling rate of from 5 to 20° C./hour, and for cooling the saturated solution in a second cooling step at a second cooling rate of from 1 to 19° C./hour to a temperature of 10 to 20° C.; and outlet means for removing granular recrystallized potassium fluorotantalate or recrystallized potassium fluoroniobate from the container means.

15. The system according to claim 15, wherein the first cooling rate is at least 1° C. or greater than the second cooling rate.

16. The system according to claim 15, further comprising means for controlling a temperature of a portion of the recrystallizing bath container which does not contain the saturated solution.

17. The system according to claim 16, wherein the means for controlling the temperature of a portion of the recrystallizing bath container which does not contain the saturated solution controls the temperature so as to be from 5° C. below to 20° C. above the temperature of the saturated solution.

* * * * *